US008218643B2

(12) United States Patent           (10) Patent No.:     US 8,218,643 B2
Huang et al.                        (45) Date of Patent:        Jul. 10, 2012

(54) LOW-POWER AND HIGH-PERFORMANCE VIDEO CODING METHOD FOR PERFORMING MOTION ESTIMATION

(75) Inventors: Shih-Chia Huang, Taipei (TW); Sy-Yen Kuo, Taipei (TW)

(73) Assignee: Acer Incorporated, Taiwan (CN)

( * ) Notice: Subject to any disclaimer, the term of this patent is extended or adjusted under 35 U.S.C. 154(b) by 361 days.

(21) Appl. No.: 12/557,766

(22) Filed: Sep. 11, 2009

(65) Prior Publication Data

US 2010/0195734 A1     Aug. 5, 2010

(30) Foreign Application Priority Data

Feb. 5, 2009  (TW) ................................ 98103649 A

(51) Int. Cl.
    H04N 7/12         (2006.01)
(52) U.S. Cl. ............................... 375/240.16; 375/240.24
(58) Field of Classification Search .................. 375/240, 375/240.01, 240.16, 240.24, 240.12
    See application file for complete search history.

(56) References Cited

U.S. PATENT DOCUMENTS

| 2005/0025244 | A1* | 2/2005 | Lee et al. | 375/240.16 |
| 2006/0245497 | A1* | 11/2006 | Tourapis et al. | 375/240.16 |
| 2006/0280248 | A1* | 12/2006 | Kim et al. | 375/240.16 |
| 2007/0092006 | A1* | 4/2007 | Malayath | 375/240.16 |
| 2007/0217514 | A1* | 9/2007 | Kumar et al. | 375/240.16 |
| 2007/0291846 | A1* | 12/2007 | Hussain | 375/240.16 |
| 2008/0205526 | A1* | 8/2008 | Kang | 375/240.16 |
| 2009/0168884 | A1* | 7/2009 | Lu et al. | 375/240.16 |
| 2009/0190037 | A1* | 7/2009 | Chang et al. | 348/699 |
| 2009/0207915 | A1* | 8/2009 | Yan et al. | 375/240.16 |
| 2010/0080297 | A1* | 4/2010 | Wang et al. | 375/240.16 |

OTHER PUBLICATIONS

Li, D., et al. "Architecture Design for H.264/AVC Integer Motion Estimation with Minimum Memory Bandwidth", IEEE Transactions on Consumer Electronics, vol. 53, No. 3, Aug. 2007, pp. 1053-1060.
Chen, C., et al. "Level C+ Data Reuse Scheme for Motion Estimation with Corresponding Coding Orders", IEEE Transactions on Circuits and Systems for Video Technology, vol. 16, No. 4, Apr. 2006, pp. 553-558.
Tuan, J., et al. "On the Data Reuse and Memory Bandwidth Analysis for Full-Search Block-Matching VLSI Architecture," IEEE Transactions on Circuits and Systems for Video Technology, vol. 12, No. 1, Jan. 2002, pp. 61-72.
Chen, T., et al. "Single Reference Frame Multiple Current Macroblocks Scheme for Multi-Frame Motion Estimation in H264/AVC," IEEE 2005, pp. 1790-1793.

\* cited by examiner

*Primary Examiner* — Andrew Lai
*Assistant Examiner* — Nguyen Ngo
(74) *Attorney, Agent, or Firm* — Snell & Wilmer, LLP

(57) ABSTRACT

A method for performing motion estimation is provided. The method includes the following steps: selecting a current block in a current frame; comparing the current block with an initial reference block in a reference frame to obtain an initial comparison parameter, wherein position of the initial reference block in the reference frame is corresponding to position of the current block in the current frame; determining a predicted search window corresponding to the current block based on the initial comparison parameter; and comparing the current block with reference blocks in the predicted search window to obtain comparison parameters respectively, whereby a best-match reference block in the predicted search window is determined.

11 Claims, 7 Drawing Sheets

LOW-POWER AND HIGH-PERFORMANCE VIDEO CODING METHOD FOR PERFORMING MOTION ESTIMATION

CROSS-REFERENCE TO RELATED APPLICATIONS

This application claims priority to Taiwan Patent Application No. 098103649 entitled "LOW-POWER AND HIGH-PERFORMANCE VIDEO CODING METHOD FOR PERFORMING MOTION ESTIMATION," filed on Feb. 5, 2009, which is incorporated herein by reference.

FIELD OF THE INVENTION

The present invention relates to a method for performing motion estimation, and more particularly to a method for performing motion estimation which is capable of effectively reducing memory usage and bandwidth requirements.

BACKGROUND OF THE INVENTION

Since multimedia applications are becoming more and more popular, the video compression techniques are also becoming increasingly important. A lot of video compression standards have been developed, such as MPEG-4 and H.264/AVC. The main principle of these standards is to eliminate redundancy between successive frames to reduce the storage requirement and the amount of transmission data. Motion estimation plays an important role in video coding for achieving compression, which can reduce the temporal redundancy based on the similarity between successive frames.

FIG. 1 is a diagram illustrating block-matching motion estimation scheme according to the prior art. At first, a current frame 100 of size W×H is divided into a plurality of current blocks of size N×N. For a current block 104, a search window 112 of size $(N+SR_H-1) \times (N+SR_V-1)$ is established in a reference frame 110 (e.g., the previous frame or the following frame), and after comparison between the current block 104 and candidate blocks in the search window 112, a block 114 can be identified as the block in the search window 112 that best matches the current block 104 in the current frame 100. Next, the difference (i.e., residual) between these two blocks 104 and 114 and a motion vector 120 denoting the displacement of the block 104 with respect to the block 114 are calculated. Then, the residual and the motion vector 120 can be used to represent full block 104 to remove the redundancy and achieve data compression, which is the so-called motion estimation. In other words, the purpose of the motion estimation is to estimate the motion vector and the resulting residual of each current block to represent the entire current frame. However, since a lot of candidate blocks need to be compared, the motion estimation is a compute-intensive operation with high bandwidth requirements.

FIG. 2 is a hardware architecture of a video coding system 200, in which the reference and current frames are stored in an external memory 220 and the data required for the motion estimation are loaded via an external bus 230 into an internal memory 212 and then processed by a computation engine (such as an embedded processor) 214. Therefore, during the motion estimation processing, the required candidate blocks in a search window of the reference frames are frequently transferred between the external memory 220 and internal memory 212 via the external bus 230 for data matching computation, which causes high usage of memory bandwidth. Typically, the size of the search window 112 depends on the display resolution and/or compression standards. The larger the search window 112 is, the larger the amount of data required to be loaded into the internal memory is, and also the memory bandwidth requirement is.

Therefore, it is desired to have a method for performing motion estimation capable of reducing memory bandwidth requirements.

SUMMARY OF THE INVENTION

In light of the problems of the prior art, the present invention provides a low-power and high-performance video coding method for performing motion estimation, which is suitable for MPEG-4 and H.264/AVC and can effectively reduce memory usage and bandwidth requirements.

According to one aspect of the present invention, a method for performing motion estimation is provided. The method of the present invention includes the following steps: selecting a current block in a current frame; comparing the current block with an initial reference block in a reference frame to obtain an initial comparison parameter, wherein the position of the initial reference block in the reference frame corresponds to the position of the current block in the current frame; determining a predicted search window corresponding to the current block according to a result of the comparing step; and performing block-matching operation by using the predicted search window to determine a corresponding reference block which best matches the current block.

Other aspects of the present invention would be stated and easily understood through the following description of the embodiments of the present invention. The aspects of the present invention would be appreciated and implemented by the elements and their combinations pointed out in the appended claims. It should be understood that the above summary of the invention and the following detailed description are only illustrative and are not to limit the scope of the present invention.

BRIEF DESCRIPTION OF THE DRAWINGS

The drawings are employed to illustrate the embodiments and the principles of the present invention in conjunction with the description. However, it should be understood that the present invention is not limited to the shown configurations and elements, in which.

DETAILED DESCRIPTION OF THE PREFERRED EMBODIMENTS

The present invention provides a method for performing motion estimation with spiral search algorithm and data reuse scheme, which can effectively reduce on-chip memory usage and bandwidth requirements. The range of the search window can be adjusted adaptively based on the relationship between the SAD value and the size of search window, and spatial dependence among neighboring blocks. The objects, features and advantages of the present invention will become more apparent by referring to the following description of the preferred embodiments and FIGS. 3-7. However, the apparatuses, elements, and steps of the method described in the following embodiments are intended to illustrate the present invention, but not to limit the scope of the invention.

Figure 3:
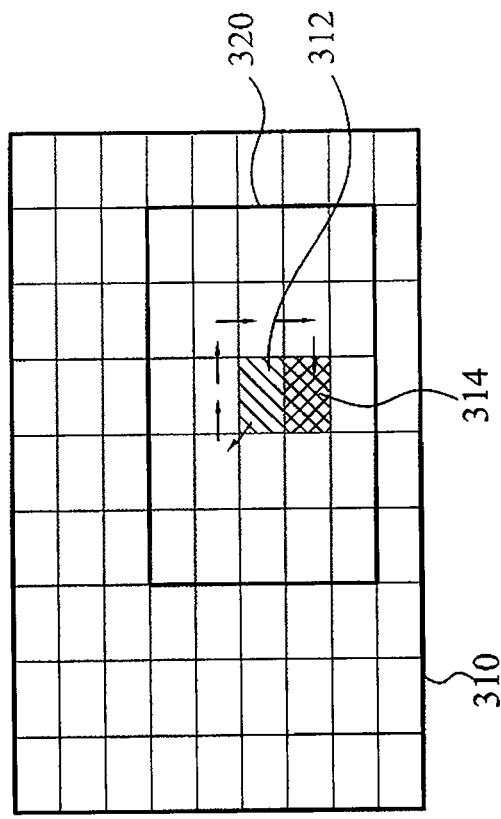
FIG. 3 is a diagram illustrating a method of performing motion estimation by using a spiral search algorithm according to an embodiment of the present invention.
Figure 3:
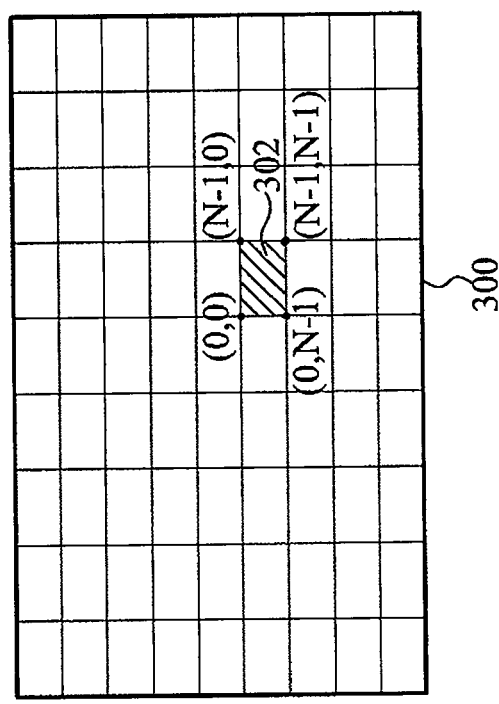

FIG. 3 is a diagram illustrating a method of performing motion estimation by using a spiral search algorithm according to an embodiment of the present invention. For a current block 302 of N×N pixels within a current frame 300, a search window 320 in a reference frame 310 is determined. Typically, the center position of the search window 320 corresponds to the position of the current block 302 in the current frame 300, and the search window 320 contains a plurality of candidate blocks to be compared to the current block 302. A block within the search window 320 that most closely matches the current block 302 is identified by performing block-matching motion estimation. In this embodiment, the block-matching motion estimation is based on computing the sum of absolute difference (SAD) between the current block 302 and each of the candidate blocks in the search window 320, which can be obtained via the following equation:

$$SAD = \sum_{i=0}^{N-1} \sum_{j=0}^{N-1} |(C_{ij} - R_{ij})|$$

where $C_{ij}$ denotes the set of pixels that belong to the current block, $R_{ij}$ denotes the set of pixels that belong to one of the candidate blocks. Each pixel in the current block is compared to a subtracted from each related pixel in candidate block for obtaining N×N difference values, and then absolute values of N×N difference values are summed up to obtain the SAD value. A smaller SAD value indicates that the current block is more similar to the candidate block. It should be noted that the SAD value described above for determining the similarity between the current block 302 and the candidate blocks is intended only for illustration, and is not intended to limit the present invention. Other criteria, such as mean square error or mean absolute error, can also be adopted in the present invention.

In one embodiment, when performing motion estimation for the block 302, a block 312 in the reference frame 310 corresponding to the position of the block 302 in the current frame is loaded and compared with the block 302 to determine the SAD value thereof. If the SAD value is smaller than a predetermined threshold value, the process of motion estimation for the block 302 ends (with a calculated motion vector (0,0)) and then proceeds for the next block. If the SAD value between the block 302 and the block 312 is larger than the predetermined threshold value, then the size of the search window 320 is adjusted adaptively according to the SAD value. Generally, the smaller the SAD value between the blocks 302 and 312 is, the smaller the search window corresponding to the block 320 should be. After the adaptively adjusted search window 320 is loaded, comparison is performed within the search window 320 along a spiral path until a SAD value is found to be smaller than the predetermined threshold value. In other words, according to one embodiment of the present invention, at first only the data of the reference frame corresponding to the position of the target block in the current frame need to be loaded for comparison. After comparison, the amount of data required to be loaded into the internal memory is determined based on the comparison result, i.e., the size of the search window 320 can be adaptively adjusted. Therefore, the method of the present invention can reduce the amount of data necessary to be transmitted into the internal memory, which can not only decrease the transmission time and power consumption, but also lower the size requirement of the internal memory and the hardware cost.

As shown in FIG. 3, this embodiment performs motion estimation to identify a block in the reference frame 310 that is most similar to the current block 302 by using spiral search algorithm. The comparison starts from the block 312 corresponding to the position of the block 302 and then proceeds along a spiral path outwards from the center. The search will stop when comparing with a block (such as block 314) having a SAD value smaller than a predetermined threshold value. Typically, since the motion vector tends to concentrate on the search center, the spiral search algorithm can substantially reduce the computing cost.

Figure 4:
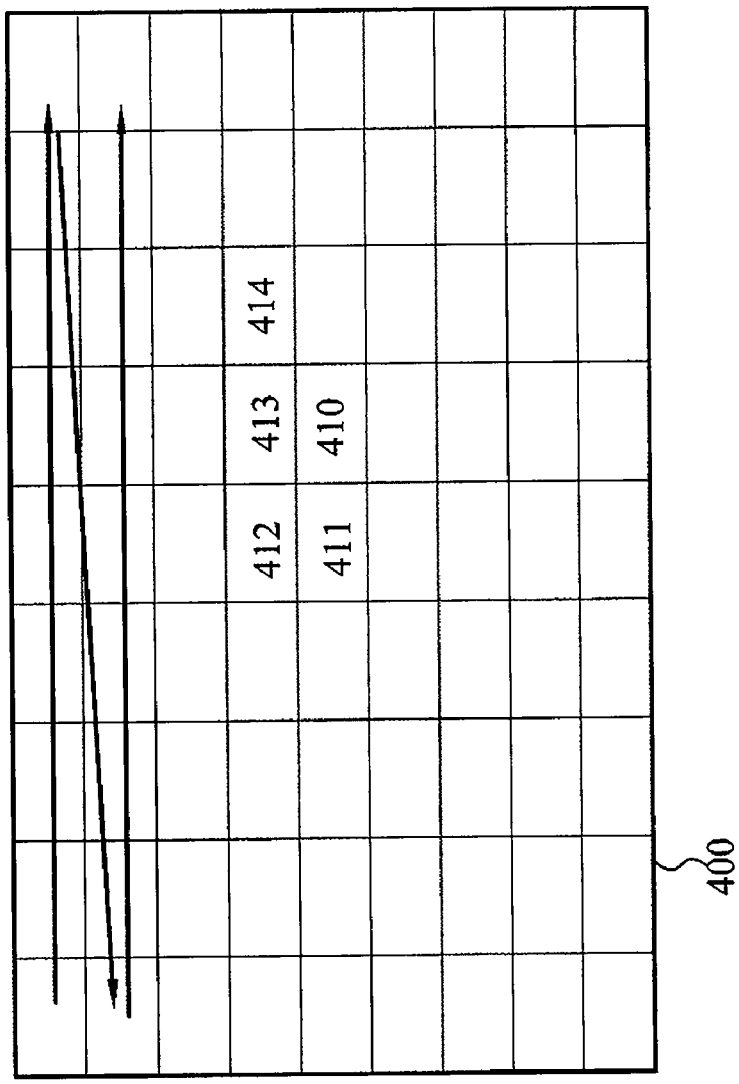
FIG. 4 illustrates an example of scanning in raster order.

The above-described motion estimation process will be performed for each block in the current frame 300 to find a corresponding matching block in the reference frame respectively. The processing order of performing motion estimation determines which blocks around a particular block have been already estimated. For example, FIG. 4 is a schematic diagram illustrating a motion estimation performed in raster order. The blocks in the frame 400 are scanned from left to right and from top to bottom. Therefore, for a particular block (such as block 410), its left, upper-left, upper, and upper-right neighboring blocks have been processed by the motion estimation method and therefore their motion vectors and search windows are available. The search window can be adaptively adjusted based on the related information of the neighboring blocks and spatial correlation between neighborhood blocks. Therefore, the present invention can adjust the size of the search window according to result of the first comparison, which is a comparison with an initial reference block corresponding to the position of the current block in the current frame, and the size of search windows of the neighboring blocks, such that the requirements of memory bandwidth can be effectively reduced. The present invention is not limited to any particular scanning order. For example, zigzag-scanning order is also suitable for use in the present invention. It should be noted that the type of scanning order determines which neighboring blocks have received motion estimation results for predicting the search window.

Except for the data prediction, the present invention also adopts the data reuse scheme in memory management, which can lower the number of the memory access and data transfer by storing the reusable data in the internal memory. In other words, after evaluating the reusability of data, an internal memory can be added for avoiding repeatedly accessing the same data, which is capable of effectively reducing the requirements of memory bandwidth. The illustration regarding the data reuse scheme can be found in the following articles: "Architecture Design for H.264/AVC Integer Motion Estimation with Minimum Memory Bandwidth", by D. X. Li et al., IEEE Trans. Consumer Electron., vol. 53, no. 3, pp. 1053-1060, August 2007; "On the data reuse and memory bandwidth analysis for full-search block-matching VLSI architecture", by J. C. Tuan et al., IEEE Trans. Circuits Syst. Video Technol., vol. 12, no. 1, pp. 61-72, January 2002; "Level C+ data reuse scheme for motion estimation with corresponding coding orders", by C. Y. Chen et al., IEEE Trans. Circuits Syst. Video Technol., vol. 16, no. 4, pp. 553-558, April 2006; and "Single Reference Frame Multiple Current Macroblocks Scheme for Multiple Reference Frame Motion Estimation in H.264/AVC", by T. C. Chen et al., IEEE Trans. Circuits Syst. Video Technol., vol. 17, no. 2, pp. 242-247, February 2007, the entire contents of which being incorporated herein by reference.

The performance of the data reuse scheme can be evaluated by two factors: the size of the internal memory and the redundancy access factor Ra. The internal memory represents the required memory size to buffer the data of reference blocks for data reuse, and the redundancy access factor Ra can be used for estimating the bandwidth of the external memory and expressed as:

$$Ra = \frac{\text{Total memory bandwidth for reference frame}}{\text{Minimum memory bandwidth (pixel count in total)}}$$

The lower the level of the data reuse is, the higher the Ra is, and also the higher the bandwidth requirement of the memory is. In contrast, a stronger data reuse level has a smaller Ra and requires lower bandwidth requirement of the memory. The total memory bandwidth can be expressed as:

$$BW = f \times W \times H \times Ra_{current\text{-}frame} + f \times W \times H \times Ra_{reference\text{-}frame}$$

where f is frame rate, W is width of the frame, and H is height of the frame.

Typically, the memory bandwidth depends on the frame rate, frame size, size of the search window, and Ra value, and the frame rate and the frame size are usually fixed for a specific video compression application. Therefore, the present invention utilizes the data reuse scheme with smaller Ra along with the data prediction manner to reduce the size of search window, and further to effectively lower the memory bandwidth.

Figure 1:
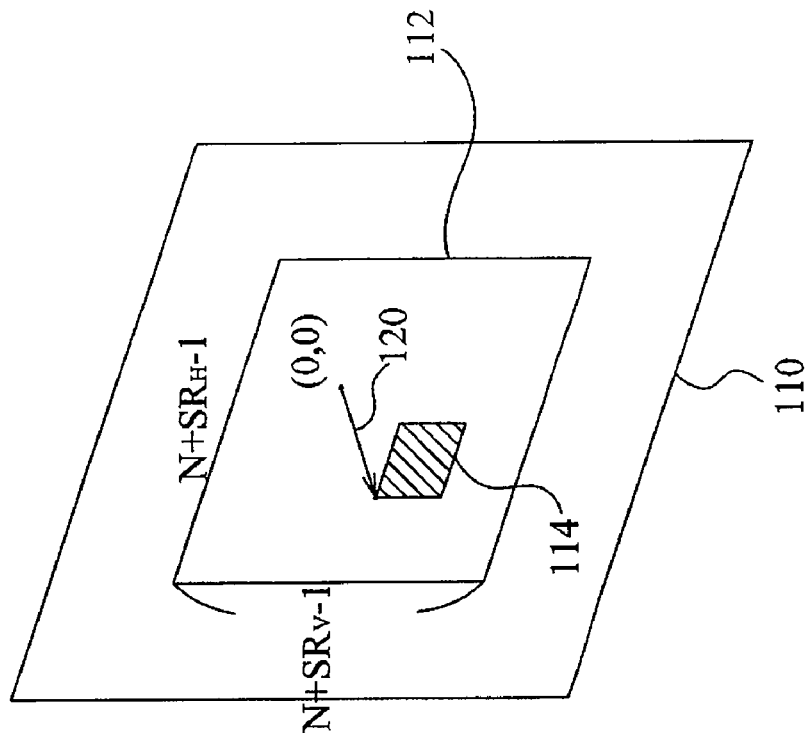
FIG. 1 is a diagram illustrating block-matching motion estimation scheme according to the prior art.
Figure 1:
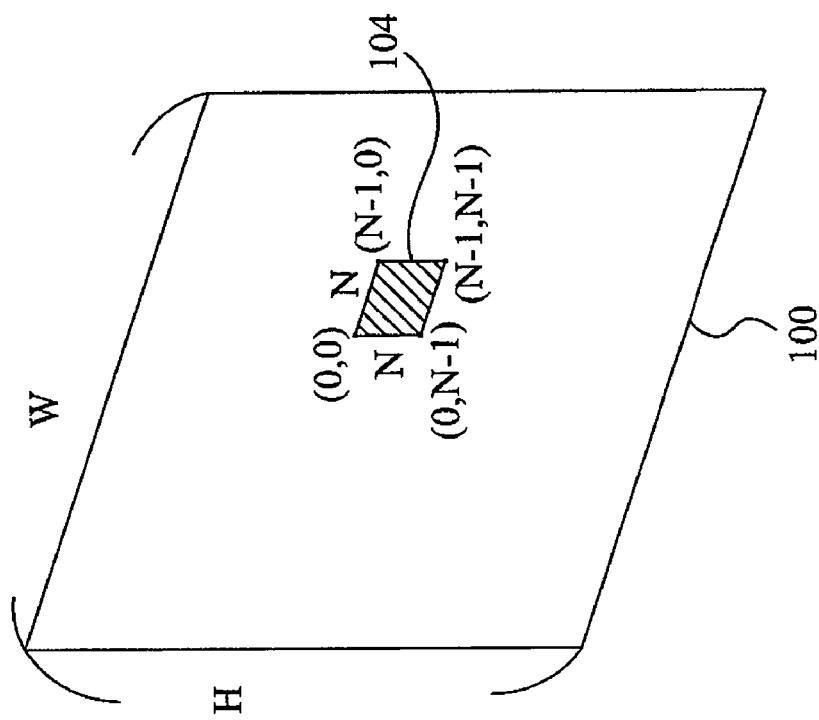
Figure 2:
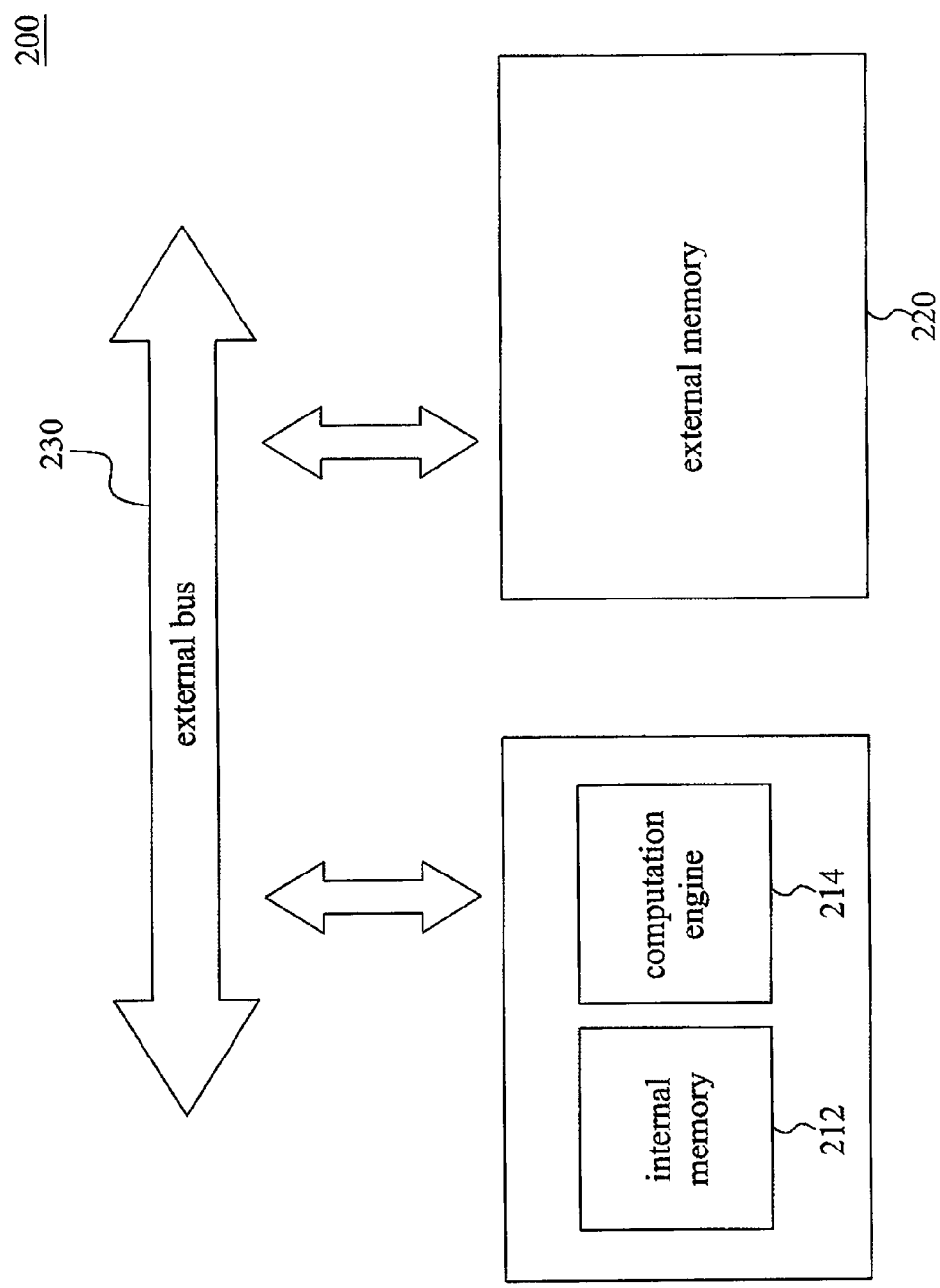
FIG. 2 is a hardware architecture of a video coding system.

For one current frame, such as frame 100 in FIG. 1, each block is accessed $SR_H \times SR_V$ times on average, then Ra can be expressed as:

$$Ra = \frac{W \times H \times SR_H \times SR_V}{W \times H} = SR_H \times SR_V$$

Nevertheless, Ra of the current frame can be reduced to 1 by adding a N×N internal memory, which is:

$$Ra = \frac{(W/N) \times (H/N) \times N \times N}{W \times H} = 1$$

Figure 5:
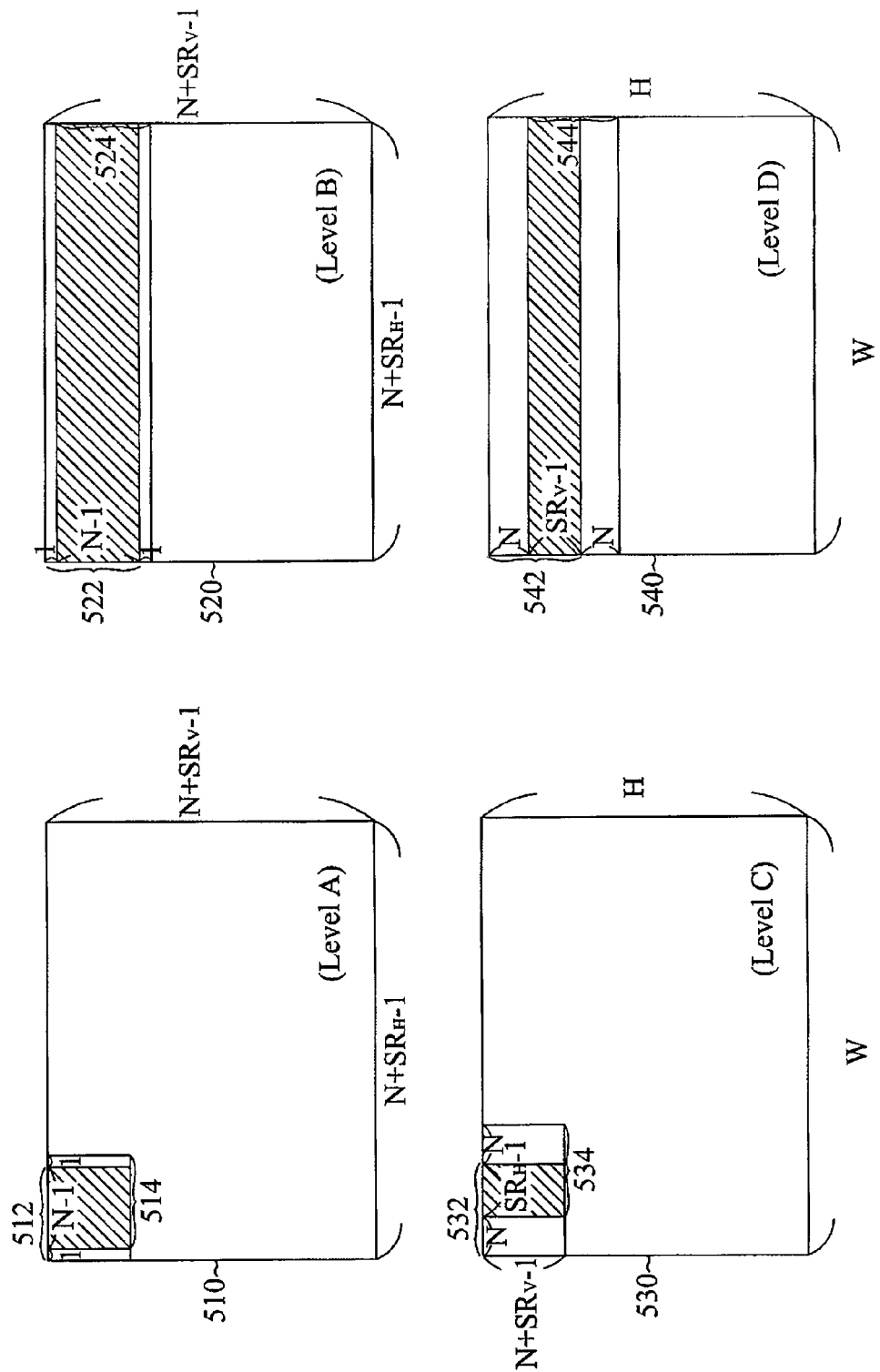
FIG. 5 shows level A to level D of data reuse schemes for the reference frame.

FIG. 5 shows level A to level D of data reuse schemes in a reference frame, wherein the data in the shaded area can be reused without being accessed from the external memory again. Level A and level B each describes data reuse within a single search window, while level C and level D involve data reuse among different search windows. In detail, concerning a block of N×N pixels in the current frame, level A can reuse the overlapped pixels of two sequential candidate blocks 512 and 514 in horizontal direction within a signal search window 510 of $(N+SR_H-1) \times (N+SR_V-1)$ pixels in the reference frame, and level B can reuse the overlapped pixels of two sequential candidate block strips 522 and 524 in vertical direction within the search window 520. Level C can reuse the overlapped pixels of two search windows 532 and 534, which respectively correspond to two sequential current blocks in a horizontal direction, within the reference frame 530, and level D can reuse the overlapped pixels of search windows 542 and 544, which respectively correspond to two sequential strips of current blocks in a vertical direction, within the reference frame 540. As described above, the total memory bandwidth is decided by Ra, and Ra for level A to level D can be calculated as follows:

$$\text{Level } A: \quad Ra = \frac{W/N \times H/N \times SR_V \times N \times (N + SR_H - 1)}{W \times H}$$
$$= SR_V \times \left(1 + \frac{SR_H}{N}\right)$$

$$\text{Level } B: \quad Ra = \frac{W/N \times H/N \times SR_V \times N \times (N + SR_H - 1)}{W \times H}$$
$$= SR_V \times \left(1 + \frac{SR_H}{N}\right)$$

$$\text{Level } C: \quad Ra = \frac{W/N \times H/N \times SR_V \times N \times (N + SR_H - 1)}{W \times H}$$
$$= SR_V \times \left(1 + \frac{SR_H}{N}\right)$$

$$\text{Level } D: \quad Ra = \frac{W \times H}{W \times H}$$
$$= 1$$

Therefore, level D has strongest reuse degree and smallest memory bandwidth. On the other hand, as shown in FIG. 5, the required sizes of the internal memory for level A to level D schemes are listed in the following table:

| Reuse Level | Internal Memory Size |
| --- | --- |
| A | N × (N − 1) |
| B | (N + $SR_H$ − 1) × (N − 1) |
| C | ($SR_H$ − 1) × ($SR_V$ + N − 1) |
| D | W × ($SR_V$ − 1) |

Figure 6:
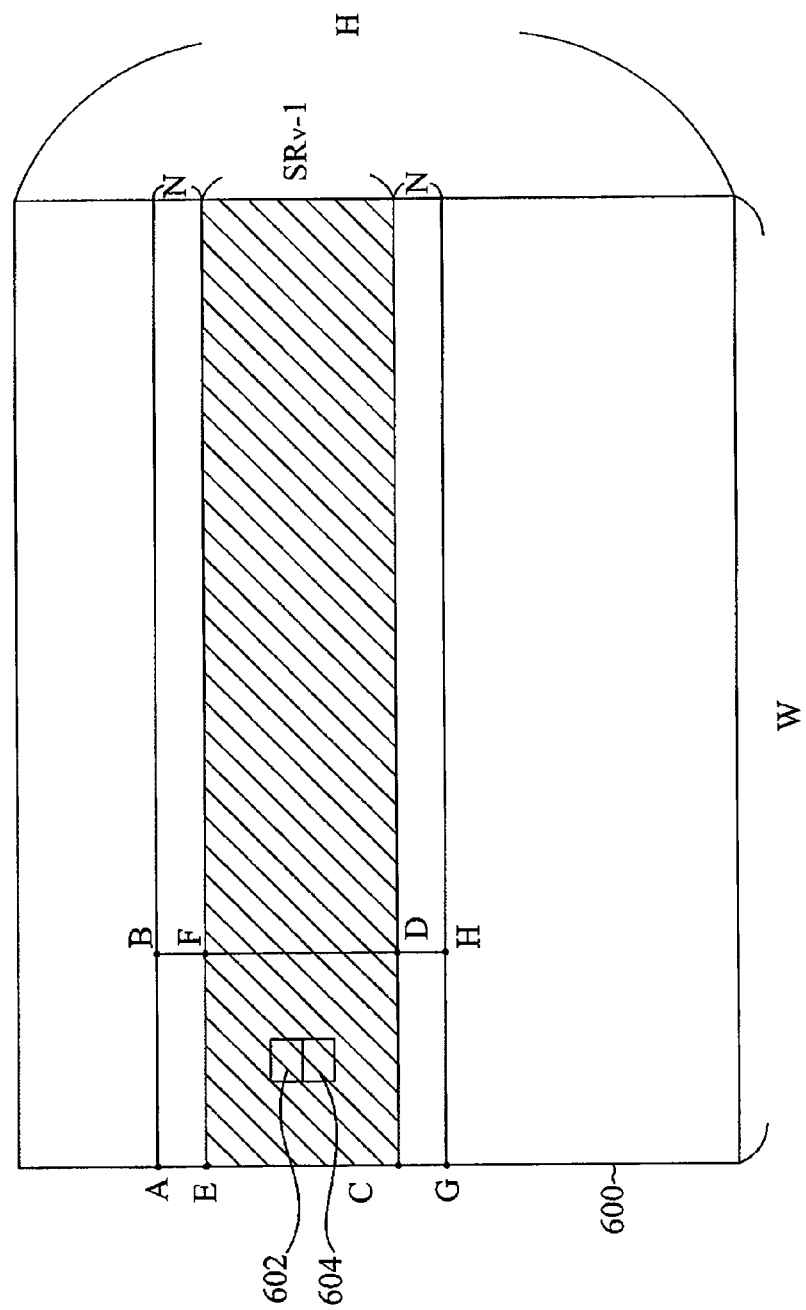
FIG. 6 is an illustrative diagram of level D scheme.

According, there is a trade-off between internal memory size and the memory bandwidth requirement. For example, level A has smallest size of the internal memory size but highest bandwidth requirement, while level D has smallest memory bandwidth but requires huge internal memory. Therefore, the present invention applies the method of adaptively adjusting the size of search window as described in preceding paragraphs to the level D scheme, so as to not only effectively reduce the internal memory size but also can lower the memory bandwidth required by level D scheme. For further illustration, FIG. 6 depicts the level D scheme in detail, wherein the search window ABCD in the reference frame 600 corresponds to the current block 602 and the search window EFGH in the reference frame 600 corresponds to the current block 604. When performing motion estimation for the block 602, a search window strip, i.e. a row of search windows in the horizontal direction, is loading into the internal memory, and then motion estimation is executed for a block strip including block 602. Next, moving downward to the block 604, the motion estimation for the block 604 and its successive blocks in the horizontal direction is performed, and, at this time, only the extra region under the gray part is need to be loaded because the data in the gray region can be reused. The present invention can predict and adaptively adjust the size of the search window based on the SAD value of the first comparison and the sizes of the search windows corresponding to the neighboring blocks. Further, instead of loading the whole search windows corresponding to two adjacent rows of blocks as the conventional Level D did, the present invention can only load the predicted search windows corresponding to two adjacent rows of blocks. In other words, the present invention combines the function of data reuse and the function of data prediction.

Figure 7:
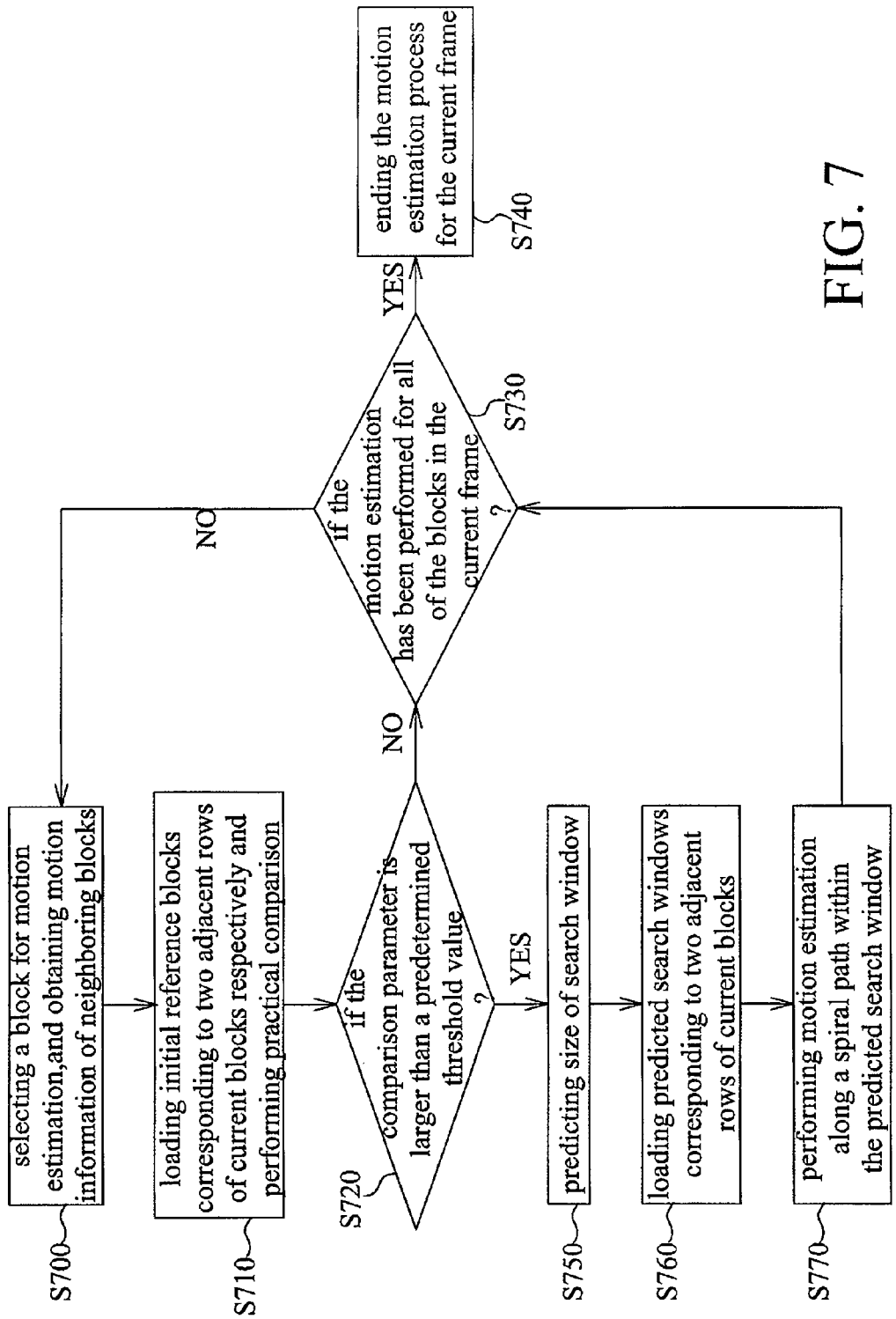
FIG. 7 is a flowchart showing a method for performing motion estimation in accordance with one embodiment of the present invention.

FIG. 7 is a flowchart showing a method for performing motion estimation in accordance with one embodiment of the present invention. Typically, before performing block-matching motion estimation, the current frame is divided into a plurality of blocks and the block scanning order for performing the motion estimation is chosen. In this embodiment, the block scanning order of motion estimation is raster scanning order, and for each specific block, the motion estimation is performed by spiral search algorithm. First, in step S700, a block is selected for motion estimation, and motion information (such as adaptive search window, predicted motion vector, and residual values) of some of its neighboring blocks which have already been processed by motion estimation are obtained. Next, in the step S710, the initial reference blocks corresponding to two adjacent rows of current blocks respectively are loaded, and each of these current blocks is practically compared with its corresponding reference block to obtain a corresponding comparison parameter defined as follow:

$$\mu_n = \left[\frac{SAD_n}{N \times N} + \varepsilon\right]$$

where the $\mu_n$ is the initial comparison parameter for n-th block, $SAD_n$ is the SAD value for n-th block, and $\varepsilon$ is a constant factor for n-th block.

Next, in step S720, the comparison parameter $\mu_n$ obtained in step S710 is compared with a predetermined threshold value which can be adjusted according to different requirements in practical applications and is not limited by the present invention. If the comparison parameter is smaller than the predetermined threshold value in step S720, the motion estimation for this block is terminated, and the procedure proceeds to step S730 to determine whether the motion estimation has been performed for all of the blocks. If it does, the procedure ends at step S740. Otherwise, the procedure returns to step S700 to perform motion estimation for next block.

In step S720, if the comparison parameter is larger than the predetermined threshold value, the procedure proceeds to step S750 to predict the size of the adaptive search window of the current block according to the search windows of neighboring blocks. In this embodiment, the predicted size is obtained by the following steps: averaging the sizes of the search windows of the upper-left, upper, upper-right, and left neighboring blocks, multiplying by maximum value of the motion vectors of the neighboring blocks, and incorporating one or more constant factors for fine-tune adjustment, which is defined as the following:

Avg(LEFT$_{ASR}$, TOP$_{ASR}$, TOP-RIGHT$_{ASR}$, TOP-LEFT$_{ASR}$)×Max($MV_x$, $MV_y$)×δ+θw where LEFT$_{ASR}$ is a predicted search window corresponding to a left neighboring block of the current block, TOP$_{ASR}$ is a predicted search window corresponding to a upper neighboring block of the current block, TOP-RIGHT$_{ASR}$ is a predicted search window corresponding to a upper-right neighboring block, RIGHT$_{ASR}$ is a predicted search window of a right neighboring block, TOP-LEFT$_{ASR}$ is a predicted search window of a upper-left neighboring block of the current block, ($MV_x$, $MV_y$) is a set of motion vectors containing motion vectors of upper, upper-left, upper-right, and right neighboring blocks, Max represents a maximum value function, Avg represents an average value function, and δ and θ are two different constant factors which are determined based on practical experience and can be adjusted to suit specific applications. It should be noted that the above equation for predicting search window could be modified to accommodate changes in block scanning order. Next, in step S760, only the predicted search windows, rather than the whole search windows, corresponding to two adjacent rows of current blocks need to be loaded from the external memory into the internal memory. Next, in the step S770, the motion estimation is performed for the selected block along a spiral path to find a best-match block. If the best-match block is found in the step S770, the procedure goes back to step S730 and repeats the above-mentioned steps until the motion estimation for the current frame is completed.

The present invention predicts the adaptive range of search window by utilizing the range of the search windows of the neighbor blocks and the result of the first practical comparison. In the present invention, only the predicted search windows (instead of the whole search range like the conventional Level D data reuse method) corresponding to blocks in two adjacent rows are required to be loaded. The present invention can effectively reduce the requirement of bandwidth for both the external memory and the internal memory. Specifically, the usage of the internal memory can be reduced to 30% and bandwidth requirements can also be reduced to approximately 25%.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

We claim:

1. A method for performing motion estimation, comprising:
  (a) selecting a current block in a current frame;
  (b) comparing the current block with an initial reference block in a reference frame to obtain an initial comparison parameter, wherein position of the initial reference block in the reference frame is corresponding to position of the current block in the current frame;
  (c) determining a predicted search window corresponding to the current block based on the initial comparison parameter; and
  (d) comparing the current block with reference blocks in the predicted search window to obtain comparison parameters respectively, whereby a best-match reference block in the predicted search window is determined;
  wherein each of the comparison parameters is a function of a SAD (sum of absolute difference) value between the current block and each of the reference, blocks and is represented as:

$$\mu = \frac{SAD}{N \times N} + \varepsilon$$

where SAD denotes a sum of absolute difference, $\varepsilon$ is a constant factor, and a size of each block is N×N.

2. The method according to claim 1, wherein the step (d) is performed along a spiral path.

3. The method according to claim 2, wherein in the step (d), when a comparison parameter of a specific reference block is smaller than a predetermined threshold value, the step (d) is terminated and the specific reference block is determined as the best-match reference block.

4. The method according to claim 1, further comprising a step of obtaining a plurality of predicted search windows respectively corresponding to a plurality of neighboring blocks of the current block.

5. The method according to claim 4, wherein the predicted search window corresponding to the current block is represented as:

$$\text{Avg}(\text{LEFT}_{ASR}, \text{TOP}_{ASR}, \text{TOP-RIGHT}_{ASR}, \text{TOP-LEFT}_{ASR}) \times \text{Max}(MV_x, MV_y) \times \delta + \theta$$

where $\text{LEFT}_{ASR}$ is a predicted search window of a left neighboring block of the current block, $\text{TOP}_{ASR}$ is a predicted search window of a upper neighboring block of the current block, $\text{TOP-RIGHT}_{ASR}$ is a predicted search window of a upper-right neighboring block of the current block, $\text{RIGHT}_{ASR}$ is a predicted search window of a right neighboring block of the current block, $\text{TOP-LEFT}_{ASR}$ is a predicted search window of a upper-left neighboring block of the current block, $(MV_x, MV_y)$ is a set of motion vectors containing motion vectors of upper, upper-left, upper-right, and right neighboring blocks, Max represents a maximum value function, Avg represents an average value function, and $\delta$ and $\theta$ are two different constant factors.

6. The method according to claim 5, further comprising a step of repeating the step (a) to the step (d), wherein in the step (a), the current block is selected in a raster-scan order.

7. The method according to claim 1, further comprising the following steps:
(e) determining predicted search windows corresponding to blocks in a current row associated with the selected current block;
(f) loading the predicted search windows determined in the step (e) from an external memory into an internal memory;
(g) performing block-matching operation for the blocks in the current row;
(h) determining predicted search windows corresponding to blocks in a next row adjacent to said current row; and
(i) comparing the predicted search windows determined in the step (e) and the predicted search windows determined in the step (h) to determine an added predicted search window, and loading the added predicted search window from the external memory into the internal memory.

8. A non-transitory computer readable medium embedded with a computer executable program including instructions for causing a computing device to implement the method of claim 1.

9. A method for performing motion estimation, comprising:
(a) selecting a current block in a current frame;
(b) comparing the current block with an initial reference block in a reference frame to obtain an initial comparison parameter, wherein position of the initial reference block in the reference frame is corresponding to position of the current block in the current frame;
(c) determining a predicted search window corresponding to the current block based on the initial comparison parameter and a plurality of predicted search windows respectively corresponding to a plurality of neighboring blocks of the current block; and
(d) comparing the current block with reference blocks in the predicted search window to obtain comparison parameters respectively, whereby a best-match reference block in the predicted search window is determined,
wherein the predicted search window corresponding to the current block is represented as:

$$\text{Avg}(\text{LEFT}_{ASR}, \text{TOP}_{ASR}, \text{TOP-RIGHT}_{ASR}, \text{TOP-LEFT}_{ASR}) \times \text{Max}(MV_x, MV_y) \times \delta + \theta$$

where $\text{LEFT}_{ASR}$ is a predicted search window of a left neighboring block of the current block, $\text{TOP}_{ASR}$ is a predicted search window of a upper neighboring block of the current block, $\text{TOP-RIGHT}_{ASR}$ is a predicted search window of a upper-right neighboring block of the current block, $\text{RIGHT}_{ASR}$ is a predicted search window of a right neighboring block of the current block, $\text{TOP-LEFT}_{ASR}$ is a predicted search window of a upper-left neighboring block of the current block, $(MV_x, MV_y)$ is a set of motion vectors containing motion vectors of upper, upper-left, upper-right, and right neighboring blocks, Max represents a maximum value function Avg represents an average value function, and $\delta$ and $\theta$ are two different constant factors.

10. The method according to claim 9, further comprising a step of repeating the step (a) to the step (d), wherein in the step (a), the current block is selected in a raster-scan order.

11. The method according to claim 9, further comprising the following steps:
(e) determining predicted search windows corresponding to blocks in a current row associated with the selected current block;
(f) loading the predicted search windows determined in the step (e) from an external memory into an internal memory;
(g) performing block-matching operation for the blocks in the current row;
(h) determining predicted search windows corresponding to blocks in a next row adjacent to said current row; and
(i) comparing the predicted search windows determined in the step (e) and the predicted search windows determined in the step (h) to determine an added predicted search window, and loading the added predicted search window from the external memory into the internal memory.

* * * * *